(12) United States Patent
Damasio et al.

(10) Patent No.: US 12,118,449 B2
(45) Date of Patent: Oct. 15, 2024

(54) MACHINES WITH FEELING ANALOGUES

(71) Applicant: University of Southern California, Los Angeles, CA (US)

(72) Inventors: Antonio Damasio, Los Angeles, CA (US); Kingson Man, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 370 days.

(21) Appl. No.: 17/210,463

(22) Filed: Mar. 23, 2021

(65) Prior Publication Data
US 2021/0295131 A1 Sep. 23, 2021

Related U.S. Application Data

(60) Provisional application No. 62/993,526, filed on Mar. 23, 2020.

(51) Int. Cl.
*G06N 3/02* (2006.01)
*G06N 3/008* (2023.01)
*G06N 3/045* (2023.01)
*G06N 3/06* (2006.01)
*G06N 3/065* (2023.01)

(52) U.S. Cl.
CPC ............. *G06N 3/02* (2013.01); *G06N 3/008* (2013.01); *G06N 3/045* (2023.01); *G06N 3/06* (2013.01); *G06N 3/061* (2013.01); *G06N 3/065* (2023.01)

(58) Field of Classification Search
CPC ............ G06N 3/06; G06N 3/008; G06N 3/02; G06N 3/045; G06N 3/061; G06N 3/065; G06N 20/00
See application file for complete search history.

(56) References Cited

U.S. PATENT DOCUMENTS 9,625,330 B2 * 4/2017 Park ...................... G01L 1/205
11,286,144 B2 * 3/2022 Lessing ............... B25J 15/0023
(Continued)

OTHER PUBLICATIONS

Brown et al., "Autonomous Control System and Method using Emodied Homeostatic Feedback in an Operating Environment" Jan. 9, 2020, U.S. Appl. No. 62/959,122 pp. 1-69. (Year: 2020).*
(Continued)

*Primary Examiner* — Miranda M Huang
*Assistant Examiner* — Chase P. Hinckley
(74) *Attorney, Agent, or Firm* — Nixon Peabody LLP

(57) ABSTRACT

A system includes a housing, sensors, actuators, and a processing device. The housing is formed of material that is soft, flexible, stretchable, deformable, or any combination of thereof. Each sensor is disposed on a surface of the housing, disposed at least partially inside the housing, or positioned spaced apart from the housing, and are configured to generate data associated with physical properties of the housing an environment external to the housing. The processing device is configured to implement a neural network having one or more inputs and one or more outputs. The inputs include the data associated with the physical properties of the housing and the data associated with the environment external to the housing. The outputs are based on the data associated the physical properties of the housing and the data associated with the environment external to the housing.

20 Claims, 2 Drawing Sheets

(56) References Cited

U.S. PATENT DOCUMENTS

| | | | | |
|---|---|---|---|---|
| 11,300,397 | B2* | 4/2022 | Kim | G01L 1/2231 |
| 11,682,276 | B2* | 6/2023 | Majidi | C08L 83/04 |
| | | | | 428/321.5 |
| 2017/0239821 | A1* | 8/2017 | Lessing | B25J 15/12 |
| 2018/0296281 | A1* | 10/2018 | Yeung | A61B 34/32 |
| 2018/0297214 | A1* | 10/2018 | Lessing | B25J 9/142 |
| 2019/0354815 | A1* | 11/2019 | Yun | G06V 10/776 |
| 2020/0156237 | A1* | 5/2020 | Tang | B62D 57/02 |
| 2020/0338723 | A1* | 10/2020 | Sefati | A61B 34/20 |
| 2020/0371481 | A1* | 11/2020 | Chen | G06N 3/006 |
| 2021/0216049 | A1* | 7/2021 | Brown | G06N 3/047 |
| 2022/0004670 | A1* | 1/2022 | King | G06F 30/27 |
| 2022/0349695 | A1* | 11/2022 | Hellebrekers | G01R 33/0206 |
| 2023/0050299 | A1* | 2/2023 | Agogino | B62D 57/02 |
| 2023/0122515 | A1* | 4/2023 | Fok | B25J 15/12 |
| | | | | 294/86.4 |

OTHER PUBLICATIONS

Yang et al., "Electronic Skin: Recent Progress and Future Prospects for Skin-Attachable Devices for Health Monitoring, Robotics, and Prosthetics" Sep. 19, 2019, pp. 1-50. (Year: 2019).*

Thuruthel et al., "Soft robot perception using embedded soft sensors and recurrent neural networks" Jan. 2019, pp. 1-31. (Year: 2019).*

Deistler et al., "Tactile Hallucinations on Artificial Skin Induced by Homeostasis in a Deep Boltzmann Machine" Jun. 26, 2019, arXiv:1906.10592v2, pp. 1-8. (Year: 2019).*

Gillespie et al., "Learning Nonlinear Dynamic Models of Soft Robots for Model Predictive Control with Neural Networks" Apr. 2018, pp. 39-45. (Year: 2018).*

Remmelzwaal et al., "CTNN: Corticothalamic-inspired neural network" Mar. 16, 2020, arXiv: 1910.12492v2, pp. 1-16. (Year: 2020).*

Wang et al., "Real-time Soft Body 3D Proprioception via Deep Vision-based Sensing" Dec. 6, 2019, arXiv: 1904.03820v3, pp. 1-8. (Year: 2019).*

Werner et al., "Vision-based Proprioceptive Sensing for Soft Inflatable Actuators" Sep. 19, 2019, arXiv: 1909.09096v1, pp. 1-6. (Year : 2019).*

Stovold et al., "Cognitively-inspired homeostatic architecture can balance conflicting needs in robots" Nov. 25, 2018, arXiv: 1811.10033v1, pp. 1-25. (Year: 2018).*

Keramati et Gutkin, "Homeostatic reinforcement learning for integrating reward collection and physiological stability" Dec. 2, 2014, pp. 1-26. (Year: 2014).*

Zheng et al., "Robust control of a silicone soft robot using neural networks" Dec. 18, 2019, pp. 38-45. (Year: 2019).*

Yoshida, Naoto, "Homeostatic Agent for General Environment" 2017, pp. 1-22. (Year: 2017).*

Magrans de Abril et Kanai, "Curiosity-driven reinforcement learning with homeostatic regulation" Feb. 7, 2018, 1801.07440v2, pp. 1-8. (Year: 2018).*

Zolfagharian et al., "Closed-loop 4D-printed soft robots" Dec. 12, 2019, pp. 1-16. (Year: 2019).*

Markvicka et al., "Soft Electronic Skins for Multi-Site Damage Detection and Localization" 2019, pp. 1-10. (Year: 2019).*

Bartlett et al., "Self-healing materials for soft-matter machines and electronics" May 10, 2019, pp. 1-6. (Year: 2019).*

Andersson et al., "Exploration Strategies for Homeostatic Agents" 2019, pp. 1-10. (Year: 2019).*

Bhagat et al., "Deep Reinforcement Learning for Soft Robotic Applications: Brief Overview with Impending Challenges" Nov. 23, 2018, pp. 1-34. (Year: 2018).*

Dassanayake et al., "A Deep Reinforcement Learning based Homeostatic System for Unmanned Position Control" Dec. 2019, pp. 1-10. (Year: 2019).*

Hulme et al., "Neurocomputational theories of homeostatic control" 2019, pp. 214-232. (Year: 2019).*

* cited by examiner

MACHINES WITH FEELING ANALOGUES

CROSS-REFERENCE TO RELATED APPLICATIONS

This application claims the benefit of, and priority to, U.S. Provisional Patent Application No. 62/993,526 filed on Mar. 23, 2020, which is hereby incorporated by reference herein in its entirety.

TECHNICAL FIELD

The present invention relates to robotics. Specifically, the invention relates to robotics organized according to principles of homeostasis.

SUMMARY

According to some implementations of the present disclosure, a system comprises a housing; one or more sensors; one or more actuators; one or more memory devices; and one or more processing devices. The housing is formed of material that is (i) soft, (ii) flexible, (iii) stretchable, (iv) deformable, or (v) any combination of (i)-(iv). The one or more sensors are configured to generate data. Each of the one or more sensors is (i) disposed on a surface of the housing, (ii) disposed at least partially inside the housing, or (iii) positioned spaced apart from the housing. A first sensor of the one or more sensors is configured to generate data associated with one or more physical properties of the housing. A second sensor of the one or more sensors is configured to generate data associated with an environment external to the housing. A third sensor of the one or more sensors is configured to generate data associated with a status of at least one of the one or more sensors other than the third sensor. The one or more processing devices are configured to implement one or more neural networks. The one or more neural networks have one or more inputs and one or more outputs. The inputs to the one or more neural networks include (i) the data associated with the one or more physical properties of the housing and (ii) the data associated with the environment external to the housing. The outputs to the one or more neural networks are based at least on (i) the data associated with the one or more physical properties of the housing and (ii) the data associated with the environment external to the housing.

According to implementations of the present disclosure, a method for operating a system comprises receiving (i) data associated with one or more physical properties of the system and (ii) data associated with an environment external to a housing of the system; determining a value of one or more outputs of a neural network based at least in part on the received data; determining a homeostasis level of the system based at least in part on the determined value of the one or more outputs; and modifying an execution of a task based on the determined homeostasis level.

BACKGROUND

Present-day artificially intelligent machines perform well in some narrow domains but fare poorly in novel situations. When robots and other AIs step outside of their typical environments—games and tasks with explicit rules—they quickly reach the limits of their learned abilities. Living organisms, on the other hand, exhibit versatile behaviors even when they are placed in unfamiliar circumstances. The main reason why they do so is that they are inherently vulnerable and must follow the dictates of life regulation in order to maintain homeostasis. As a result, they develop creative, non-routine solutions. Machines that implement a process resembling homeostasis will acquire a feeling-like device for the evaluation and guidance of behavior. To date, there has been no viable method of implementing analogues of feelings in machines. Disclosed is a new class of machines organized according to the principles of life regulation, or homeostasis. These machines have physical constructions that must be maintained within a narrow range of viability states and thus share some essential traits with all living systems. The fundamental innovation of these machines is the introduction of "risk-to-self". Rather than up-armoring or adding raw processing power to achieve resilience, these robots are designed, paradoxically, to be vulnerable. Concretely, these machines are composed of soft materials embedded with sensors and actuators directly relevant to the state of their own material integrity. Artificial neural networks are used to generate higher level, cross-modal mappings between internal and external sources of information. Equipped with an artificial analogue of feelings, these machines can guide their behaviors effectively and generate non-routine solutions for the problems they face. They exhibit greater levels of autonomy in unstructured environments. As one example application, a self-driving car would make decisions partially motivated by its "fear" of crashing and sustaining damage to its own body. When presented with an unfamiliar road sign or traffic pattern, it would respond with behaviors reflecting its uncertainty and caution, such as slowing down and shifting to a mode of operation that follows the lead of cars in front of it.

Figure 1:
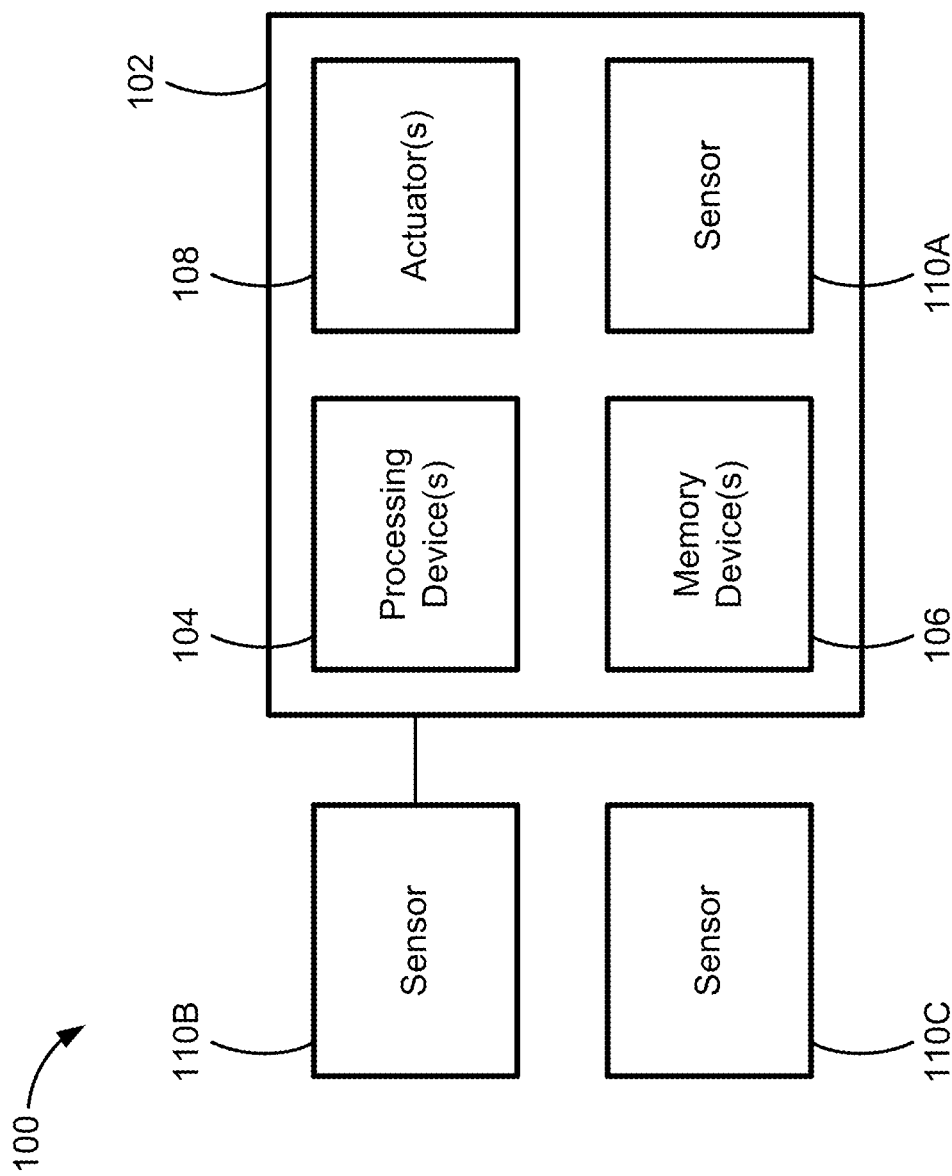
FIG. 1 is a functional block diagram of a system configured to monitor its own homeostasis levels, according to some implementations of the present disclosure.

While the invention is susceptible to various modifications and alternative forms, specific implementations have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of implementation in many different forms, there is shown in the drawings and will herein be described in detail preferred implementations of the invention with the understanding that the present disclosure is to be considered as an exemplification of the principles of the invention and is not intended to limit the broad aspect of the invention to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

FIG. 1 shows a system 100 for homeostatic self-regulation using artificial neural networks. The system 100 includes a housing 102, one or more processing devices 104, one or more memory devices 106, one or more actuators 108, and a variety of sensors. The one or more processing devices 104 can include a tensor processing unit (TPU), a graphics processing unit (GPU), a central processing unit (CPU), a field-programmable gate array (FPGA), etc. The sensors can include one or more sensors 110A that are disposed wholly or partially inside the housing 102. The sensors can also include one or more sensors 110B that are disposed on a surface of the housing 102. The sensors can further include one or more sensors 110C that are spaced apart from the housing 102.

In some implementations, the system 100 is a robotic system. The housing 102 can be formed from a material that is soft, flexible, stretchable, deformable, or any combination thereof. In some implementations, the housing 102 is formed from a material that is similar to organic tissue. Generally, the housing 102 is able to physically react and comply with the external environment surrounding the housing 102, due to the material forming the housing 102. For example, in some implementations, the housing 102 is able to compress in response to be contacted by an object, and can then return to its uncompressed state when the object no longer contacts the housing 102.

The sensors 110A-110C are configured to generate a variety of different data. The data generated by the sensors 110A-11C can include data associated with physical properties or the physical status of the housing 102 (and/or other components of the system 100), data associated with the environment external to the housing 102, or both. The data associated with the physical properties of the housing 102 and/or the physical status of the housing 102 can include data representative with the amount of stretching of the housing 102, the amount of compression of the housing 102, the amount of deformation of the housing 102, thermal properties of the housing 102 (such as the temperature at a surface of the housing 102, the temperature within the housing 102, or the thermal conductivity of the housing 102) any vibrations in or on the housing 102, an amount of strain or stress currently being experienced by the housing 102 or a portion of the housing 102, electrical properties of the housing 102 (such as electrical conductivity), an energy level of the housing 102, and others. In one example, the sensors 110A-110C can include strain gauges that are configured to generate data representative of any strains or stresses in the housing 102. This data can be indicative of any punctures or tears in the housing 102. In another example, the sensors 110A-110C can include optical sensors (e.g., a camera) that can generate image data representative of images of the system 100 and/or images of the environment external to the system 100.

This data can also be representative of the presence of any objects that are currently in contact with the housing 102. The data associated with the environment external to the housing 102 can include data representing the temperature of the external environment, the pressure of the external environment, any noise or sounds occurring near the housing 102, the location of any object within a predetermined distance from the housing 102, any forces being applied to the housing 102, and others. The predetermined distance could be one-half foot, one foot, two feet, five feet, ten feet, etc. In some implementations, any of the sensors can also generate data representative of a status of any of the other sensors. For example, if one of the sensors 110B (disposed on the surface of the housing 102) or 110C (spaced apart from the housing 102) is damaged by some external force, one of the sensors 110A (disposed at least partially inside the housing 102) can generate data indicating that the other sensor is damaged.

The one or more actuators 108 can include a variety of different types of actuators. For example, the actuators 108 could include actuators that allow for the system 100 to move, such as wheel, legs, treads, etc. The actuators 108 can also include actuators that allow the system 100 to interact with other objects, such as robotic arms. The actuators can further include actuators disposed on the surface of the housing 102 that allow the housing 102 to interact with or attach to objects. In general, the one or more actuators 108 can include one or more actuators that allow the system 100 to interact with and/or respond to external objects and/or the external environment, and perform any needed tasks.

Figure 2:
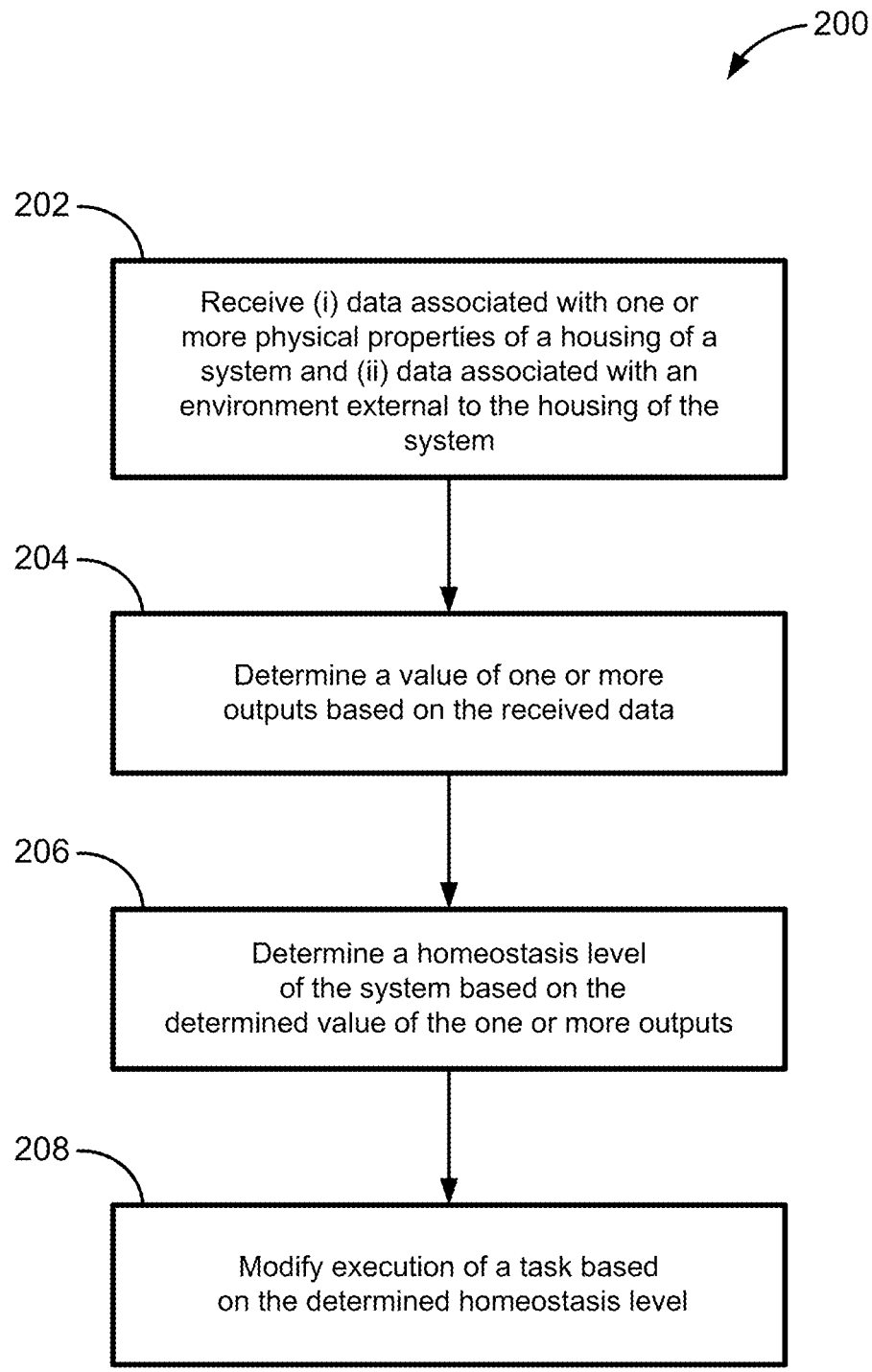
FIG. 2 is a flow diagram of a method for operating the system of FIG. 1, according to some implementations of the present disclosure.

Referring now to FIG. 2, a method 200 for operating the system 100 is shown. The one or more processing devices 104 and the one or more memory devices 106 of the system 100 are configured to implement an artificial neural network. The artificial neural network is configured to determine the homeostasis level of the system 100, and make any required adjustments to the operation of the system 100.

At step 202, data is received and stored in the one or more memory devices 106. This data can include data associated with one or more physical properties of the housing 102 of the system 100, data associated with the environment external to the housing 102 of the system 100, or both. This data could additionally or alternatively include data associated with operation of any of the sensors 110A-110C, and/or data associated with operation of any other components of the system 100. In some implementations, receiving the data includes generating the data by any one or more of the sensors 110A-110C, and storing the generated data in the one or more memory devices 106. In some implementations, the system 100 can include one or more wired communication interfaces (e.g., USB-A, USB-B, USB-C, micro-USB, mini-USB, Ethernet, SATA, eSATA, etc.) and/or one or more wireless communication interfaces (e.g., WiFi, Bluetooth, RF, RFID, etc.) that are configured to transmit and/or receive data to and/or from external sources. The communication interface of the system 100 can receive data (e.g., data from the sensors 110C that are spaced apart from the housing 102) and store the data in the one or more memory devices 106.

The artificial neural network implemented by the one or more processing devices 104 is configured to model the homeostasis level of the system 100 based on the received data (e.g., the data generated by the sensors 110A-110C and any other data). The data received at step 202 can be input into the artificial neural network. At step 204, the artificial neural network determines the values of one or more outputs of the artificial neural network. At step 206, the artificial neural network determines the homeostasis level of the system 100, or the value of a component of the homeostasis level of the system 100. The determined homeostasis level can be based at least in part on (i) the data associated the one or more physical properties of the housing and (ii) the data associated with the environment external to the housing.

The homeostasis level of the system 100 refers to the state of a variety of internal and external physical characteristics of the system 100, such as the physical status of the housing 102 (e.g., the "health" of the housing) and how external factors may impact the physical status of the housing 102. In some implementations, determining the homeostasis level of the system 100 can include determining the physical status of the housing 102, or a current value of a physical property of the system 100 (such as a physical property of the housing 102). Determining the homeostasis level of the system 100 can further include determining how the external environment and any actions or tasks of the system 100 (or future actions or tasks of the system 100) will impact the physical status and/or the physical property of the system 100.

In some implementations, determining the homeostasis level includes determining the current value of a physical property of the system 100, and determining how the execution of certain tasks will impact the value of the physical property of the system 100. The task could be a task that is currently being executed, a task that is scheduled to be executed in the future, or both. The determination can take into account the impact that the external environment will have on the system 100 (and in particular the housing 102) if the task is executed, or continues to be executed.

At step 208, the execution of a task is modified based at least in part on the determined homeostasis level of the system 100. Modifying the execution of the task can include ending the execution of a task that is currently being executed, initiation the execution of a task that has not yet begun to execute, or otherwise altering the execution of a task that is currently being executed (such as speeding up the execution, slowing down the execution, or some other alteration). In some implementations, modifying the execution of the task includes operating the actuators 108. The actuators can be operated, for example, to correct a homeostasis level of the system (e.g., to aid in restoring the value of a physical property of the system 100 to a desired value, or to aid in preventing the value of a physical property of the system 100 from becoming an undesired value). For example, the system 100 can be a robot where the actuators 108 include wheels that allow the robot to travel between locations. As the wheels move the robot toward a destination, the robot may inadvertently come into contact with undesired objects, such as obstacles in their path. Determining the homeostasis level of the robot and modifying the execution of the task can include adjusting the robot's travel to its destination if the robot contacts an obstacle, or comes within a predetermined distance of the obstacle. In another example, the housing 102 of the system 100 have sustained some sort of damage, such as punctures or tears. Determining the homeostasis level of the system 100 can include quantifying this damage, and determining what effect a current task or future tasks may have on the physical status of the housing 102. The executions of any tasks (such as the travel of the system 100 to a destination) can be modified to aid in preventing further damage to the housing 102, and/or repairing the existing damage to the housing 102.

The artificial neural network implemented by the one or more processing devices 104 can also determine the future impact of the external environment on the physical status of the system 100. Continuing with the above example, as the robot is traveling to its destination, determining the homeostasis level of the robot and modifying the execution of the task can include determining whether it is likely the robot will come into contact with any obstacles, and adjusting the robot's travel as necessary. This determination can take into account the existing physical status of the housing 102. Thus, if the housing 102 of the robot does not have any deficiencies (such as damage, punctures, or tears caused by prior impacts, contact, actions, etc.), the artificial neural network can decide to continue with the robot's current travel, as a future impact with an object may do result in much damage. But if the housing 102 of the robot does have any damage caused by prior impacts, the artificial neural network can modify the robot's travel, in order to reduce the risk of a future impact. Thus, the artificial neural network can cause the system 100 to modify the execution of a task (for example by using the actuators 108), based on the data associated with the one or more physical properties of the housing, the data associated with the external environment, the data associated with the operation of any of the sensors 110A-110C, or any combination thereof.

In some implementations, the task can be a modification of the housing 102. For example, if the system 100 determines that the housing 102 has been damaged in some way, modifying execution of the task can include initiating task to repair (wholly or partially) the housing 102 or a portion of the housing 102. The actuators 108 of the system 100 can include actuators that are designed to repair punctures or tears in the housing 102. Thus, the artificial neural network implemented by the system 100 can be used to correct the homeostasis level of the system 100. The system 100 can accomplished this by determining values of properties of the system 100 (such as physical properties of the housing 102), and taking actions to either correct undesirable values of the properties of the system 100, or maintain desirable values of the properties of the system 100.

In this manner, the system 100 is configured to model a living organism that follows the dictates of homeostasis in order to maintain body states in conditions compatible with life. The system 100 can thus be configured to evaluate its own behavior and determine how its behavior can impact its future health, physical status, etc. In some implementations, the artificial neural network implements cross-modal processing, by analyzing multiple different sources of data representative of various properties of the system 100, to determine and correct the homeostasis level of the system 100. The various data generated by the sensors 110A-110C and/or received from other sources can be remapped in a neural hierarchical fashion, with nodes in each level re-instantiating their lower-level constituent features by top-down projections. In some implementations, the neural networks can include deep Boltzmann machines, autoencoders, deep neural networks, convolutional neural networks, and others.

In some implementations, the system 100 can be modeled by a convolutional neural network implemented by one or more memory devices and one or more processing devices that are configured to analyze images. The convolutional neural network is configured to model an organism with an energy level and a nervous system. The convolutional neural network is configured to analyze a plurality of images of a handwritten digit, recognize images that contain a zero or a one, and simulate either the acceptance or the rejection of each recognized image. The acceptance of images containing a zero is configured to increase the energy level of the modeled organism and inhibit operation of the nervous system of the modeled organism. The acceptance of images containing a one is configured to increase the energy level of the organism and excite operation of the nervous system of the modeled organism. The convolutional neural network is further configured to accept or reject each recognized image, based on the results of the simulation. The convolutional neural network is then configured to modify a status of the nervous system of the modeled organism after each recognized image is accepted or rejected. In some implementations, modifying the status of the nervous system of the modeled organism includes varying the slope rectified linear activation function of the convolutional neural network.

One or more elements or aspects or steps, or any portion(s) thereof, from one or more of any of claims 1-20 below can be combined with one or more elements or aspects or steps, or any portion(s) thereof, from one or more of any of the other claims 1-20 or combinations thereof, to form one or more additional implementations and/or claims of the present disclosure.

While the present invention has been described with reference to one or more particular implementations, those skilled in the art will recognize that many changes may be made thereto without departing from the spirit and scope of the present invention. Each of these implementations and obvious variations thereof is contemplated as falling within the spirit and scope of the invention. It is also contemplated that additional implementations according to aspects of the present invention may combine any number of features from any of the implementations described herein.

What is claimed is:

1. A system implementing artificial analogues of feelings in machines, the system comprising:
    a housing formed of material that is (i) soft, (ii) flexible, (iii) stretchable, (iv) deformable, or (v) any combination of (i)-(iv), the housing configured to physically react and comply with an external environment surrounding the housing;
    one or more sensors configured to generate data, the one or more sensors including:
        a first sensor disposed on a surface of the housing and configured to generate data associated with one or more physical properties of the housing,
        a second sensor positioned spaced apart from the housing and configured to generate data associated with the environment external to the housing, and
        a third sensor disposed at least partially inside the housing and configured to generate data associated with a status of at least one of the one or more sensors other than the third sensor;
    one or more actuators;
    one or more memory devices configured to store the data associated with the one or more physical properties of the housing and the data associated with the environment external to the housing; and
    one or more processing devices configured to implement one or more neural networks with the one or more memory devices, the one or more neural networks having one or more inputs and one or more outputs,
    wherein the one or more neural networks are configured to determine a homeostasis level of the system by determining a physical status of the housing and determining an impact the environment external to the housing has on the physical status of the housing, the homeostasis level of the system being based at least on (i) the data associated with the one or more physical properties of the housing and (ii) the data associated with the environment external to the housing,
    wherein the inputs to the one or more neural networks include (i) the data associated with the one or more physical properties of the housing and (ii) the data associated with the environment external to the housing, and
    wherein the outputs to the one or more neural networks are based at least on (i) the data associated with the one or more physical properties of the housing and (ii) the data associated with the environment external to the housing.

2. The system of claim 1, wherein the physical properties of the housing include stretching of the housing, compression of the housing, deformation of the housing, vibration of the housing, a temperature of the housing, a presence of external objects contacting the housing, or any combination thereof, and
    wherein the housing is configured to compress in response to being contacted by an external object, and then return to an uncompressed state when the external object no longer contacts the housing.

3. The system of claim 1, wherein the data associated with the environment external to the housing include a temperature of the external environment, pressure of the external environment, noise or sounds occurring near the housing, a location of any object within a predetermined distance from the housing, forces being applied to the housing, or any combination thereof.

4. The system of claim 1, wherein the generated data associated with the status of the at least one of the one or more sensors include data indicating that at least the first sensor or the second sensor is damaged in case at least one of the first sensor or the second sensor has been damaged.

5. The system of claim 1, further comprising one or more wired or wireless communication interfaces configured to receive the generated data associated with the environment external to the housing from the second sensor.

6. The system of claim 1, wherein the one or more neural networks are configured to:
    correct the homeostasis level of the system by operating the one or more actuators to modify the physical status of the housing; and
    operate the one or more actuators in order to cause the system to execute a task.

7. The system of claim 1, wherein the one or more sensors include strain gauges configured to generate data representative of any strains or stresses in the housing, the generated data representative of any strains or stresses in the housing indicating any punctures or tears in the housing, and
    wherein the one or more actuators includes actuators that are designed to repair punctures or tears in the housing.

8. The system of claim 6, wherein the one or more neural networks are configured to modify the execution of the task based on the data associated with the one or more physical properties of the housing.

9. The system of claim 6, wherein the one or more neural networks are configured to modify the execution of the task based on the determined homeostasis level of the system, and the modification of the execution of the task is configured to correct the homeostasis level of the system.

10. The system of claim 1, wherein the system is configured to evaluate its own behavior and determine how its behavior can impact its future health and physical status.

11. The system of claim 6, wherein the one or more neural networks are configured to (i) determine a future impact of the environment external to the system on the physical status of the housing, and (ii) modify the execution of the task based on the determined future impact.

12. The system of claim 1, wherein the material of the housing includes organic tissue.

13. A method for operating a system implementing artificial analogues of feelings in machines, the system comprising a housing formed of material that is (i) soft, (ii) flexible, (iii) stretchable, (iv) deformable, or (v) any combination of (i)-(iv), the method comprising:
    receiving (i) data associated with one or more physical properties of the housing from a first sensor disposed on a surface of the housing, (ii) data associated with an environment external to the housing from a second sensor positioned spaced apart from the housing, and (iii) data associated with a status of at least one of the first and second sensors from a third sensor disposed at least partially inside the housing;
storing the received data in one or more memory devices of the system;
implementing one or more neural networks by one or more processing devices and the one or more memory devices, the one or more neural networks having one or more inputs and one or more outputs;
determining a value of the one or more outputs of the one or more neural networks based at least in part on the received data;
determining a homeostasis level of the system based at least in part on the determined value of the one or more outputs by determining a physical status of the housing and determining an impact the environment external to the housing has on the physical status of the housing, the homeostasis level of the system being based at least on (i) the data associated with the one or more physical properties of the housing received from the first sensor and (ii) the data associated with the environment external to the housing received from the second sensor; and
modifying an execution of a task based on the determined homeostasis level to correct the homeostasis level of the system, wherein modifying the execution of the task includes operating one or more actuators of the system in order to cause the system to execute the task,
wherein the inputs to the one or more neural networks include (i) the data associated with the one or more physical properties of the housing and (ii) the data associated with the environment external to the housing, and
wherein the outputs to the one or more neural networks are based at least on (i) the data associated with the one or more physical properties of the housing and (ii) the data associated with the environment external to the housing.

14. The method of claim 13, wherein the physical properties of the housing include stretching of the housing, compression of the housing, deformation of the housing, vibration of the housing, a temperature of the housing, a presence of external objects contacting the housing, or any combination thereof.

15. The method of claim 13, wherein modifying the execution of the task includes initiating the execution of the task, ending the execution of the task, or altering the execution of the task.

16. The method of claim 13, wherein the data associated with the environment external to the housing include a temperature of the external environment, pressure of the external environment, noise or sounds occurring near the housing, a location of any object within a predetermined distance from the housing, forces being applied to the housing, or any combination thereof.

17. The method of claim 13, wherein the one or more neural networks are configured to correct the homeostasis level of the system by operating the one or more actuators to modify the physical status of the housing.

18. The method of claim 13, wherein the one or more actuators are operated to aid in restoring a value of a physical property of the system to a desired value and to aid in preventing the value of the physical property of the system from becoming an undesired value.

19. The method of claim 13, wherein at least one of the one or more actuators is designed to repair punctures or tears in the housing.

20. The method of claim 13, wherein determining the homeostasis level of the system includes determining a future impact of the environment external to the system on the physical status of the housing, such that the execution of the task is modified based at least in part on the determined future impact.

* * * * *